July 5, 1955

P. J. MASSEY 2,712,508

METHOD AND APPARATUS FOR PREPARING THIN FILMS OF HIGH
MELTING POINT THERMOPLASTICS AND THE APPLICATION
THEREOF TO PAPER AND THE LIKE

Filed Aug. 31, 1950

Inventor:
Peter J. Massey,
By Schroeder, Merriam,
Hofgren & Brady, Attys.

July 5, 1955 P. J. MASSEY 2,712,508
METHOD AND APPARATUS FOR PREPARING THIN FILMS OF HIGH
MELTING POINT THERMOPLASTICS AND THE APPLICATION
THEREOF TO PAPER AND THE LIKE
Filed Aug. 31, 1950 2 Sheets-Sheet 2
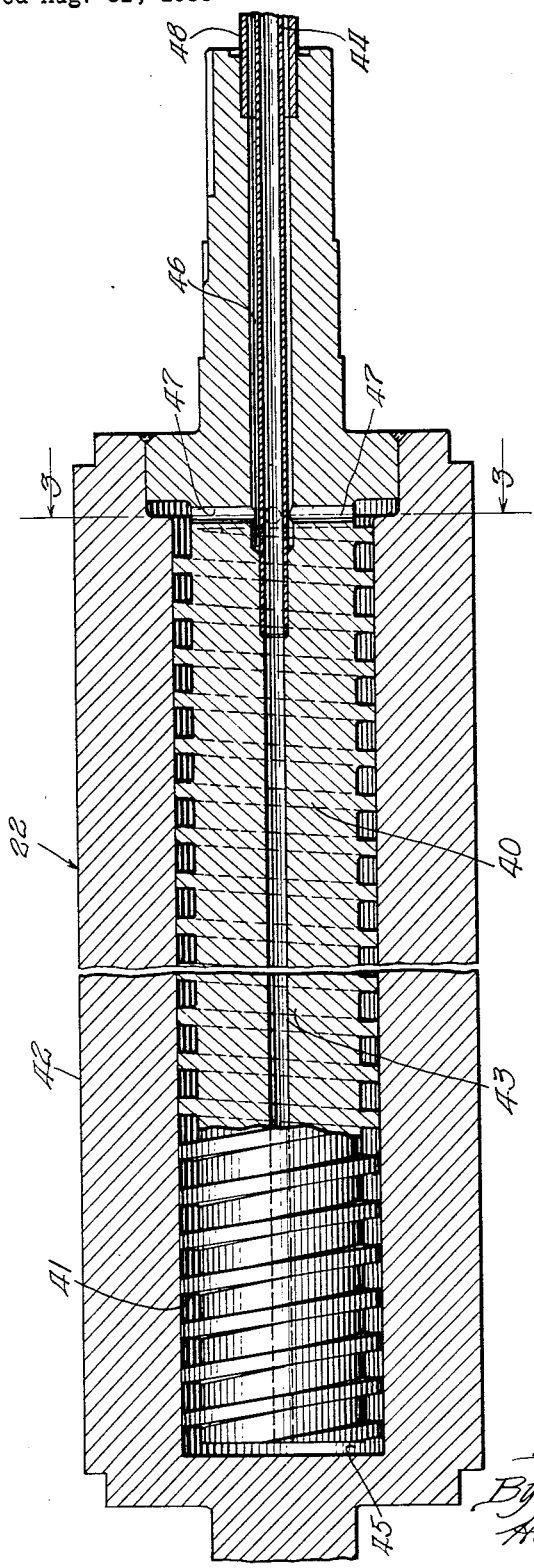
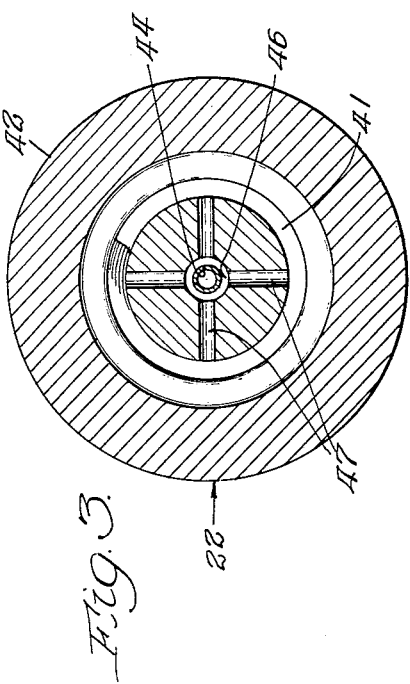
Inventor:
Peter J. Massey,
By Schroeder Merriam,
Hofgren & Brady, Attys.

ated July 5, 1955

2,712,508

METHOD AND APPARATUS FOR PREPARING THIN FILMS OF HIGH MELTING POINT THERMOPLASTICS AND THE APPLICATION THEREOF TO PAPER AND THE LIKE

Peter Jay Massey, River Forest, Ill.

Application August 31, 1950, Serial No. 182,516

16 Claims. (Cl. 117—60)

This invention relates to a method of preparing supported films of high melting point thermoplastic material, such as vinyl resins, Saran, Styron "S" polymer, styran, polyethylene and the like, and a form of apparatus for using the same.

Thermoplastic material of the types mentioned in the previous paragraph possess many desirable physical and chemical properties which make them particularly valuable in the coating of paper and fabrics to produce a composite article which is impervious to water, water vapor, heat and chemicals. All of the thermoplastics mentioned above are similar in that their softening point occurs at a very high temperature. At the softening point, the material is still quite viscous and remains quite viscous even at temperatures of 300° and above and thus cannot be handled in the ordinary manner of film forming material. They will not flow under gravity fast enough to be workable.

Apparatus has heretofore been evolved for forming unsupported films of such thermoplastic resins, and machinery is available for that purpose which will produce unsupported films in commercial widths and thicknesses at varying uniform speeds. The caliper or thickness of such films, while commercially acceptable as films for tubes, etc., is not within the tolerances required for many applications as supported films. The laminating of such films to paper or textiles is costly and unsatisfactory. Machinery to retreat or otherwise laminate the previously prepared film to paper has not yet been satisfactorily designed.

While the method and apparatus of this invention may be used for the preparation and formation of supported films from any of the materials mentioned, for the purposes of exemplary disclosure, the process will be described for the formation of supported films of polyethylene. Polyethylene is a generic term applied to ethylene polymers of various molecular weights. The higher molecular weights are primarily useful for coating paper requiring the physical properties imparted by these high molecular weight materials. These materials have a softening point of about 240° F.

The materials with which this invention is primarily concerned are organic polymers which have extraordinary viscosity, and have such viscosity throughout the working temperature range of the material. The common gravity flow viscometers do not even measure such viscosities within their working range, and it has been necessary to use relatively new measuring instruments which are known as "plastometers." The claims, therefore, refer to these materials as plastometric, and the term as so used means a product having a viscosity beyond the ordinary range of gravity flow viscometers throughout the range of temperature at which the material may be handled. This range is referred to as the "working temperature range."

I have found that the difficulties involved in handling films of high molecular weight materials, such as polyethylene or of any similar thermoplastic, which is not flowable at temperature below 212° F. and is extremely viscous at high temperatures, may be overcome by feeding the material at the temperature of formation into and across the entire length of a nip formed by a pair of rolls, one of which is moving relatively rapidly in one direction as compared to the other, in which nip the film from the supplying means loses its identity and forms a transversely extending, rotating, roll-like mass, and then withdrawing a finished coating of the material from the opposite side of the nip, the input to and withdrawal of polyethylene from the nip being substantially uniform, and the rolls being suitably heated to avoid premature solidification. This process may be used directly for coating paper or other flexible webs in which case the paper is carried by the rotating roll through and into contact with the rotating mass of thermoplastic material.

While the foregoing states the basic principles of my process, it will be appreciated that the details vary with the materials employed, the thickness of the film, the rate of movement thereof and other factors.

My invention is illustrated diagrammatically in the drawing in which:

Fig. 2 is a view of one of the rolls shown in Fig. 1, showing the interior rifling for heating the roll; and Fig. 3 is a sectional view along line 3—3 of Fig. 2.

Figure 1:
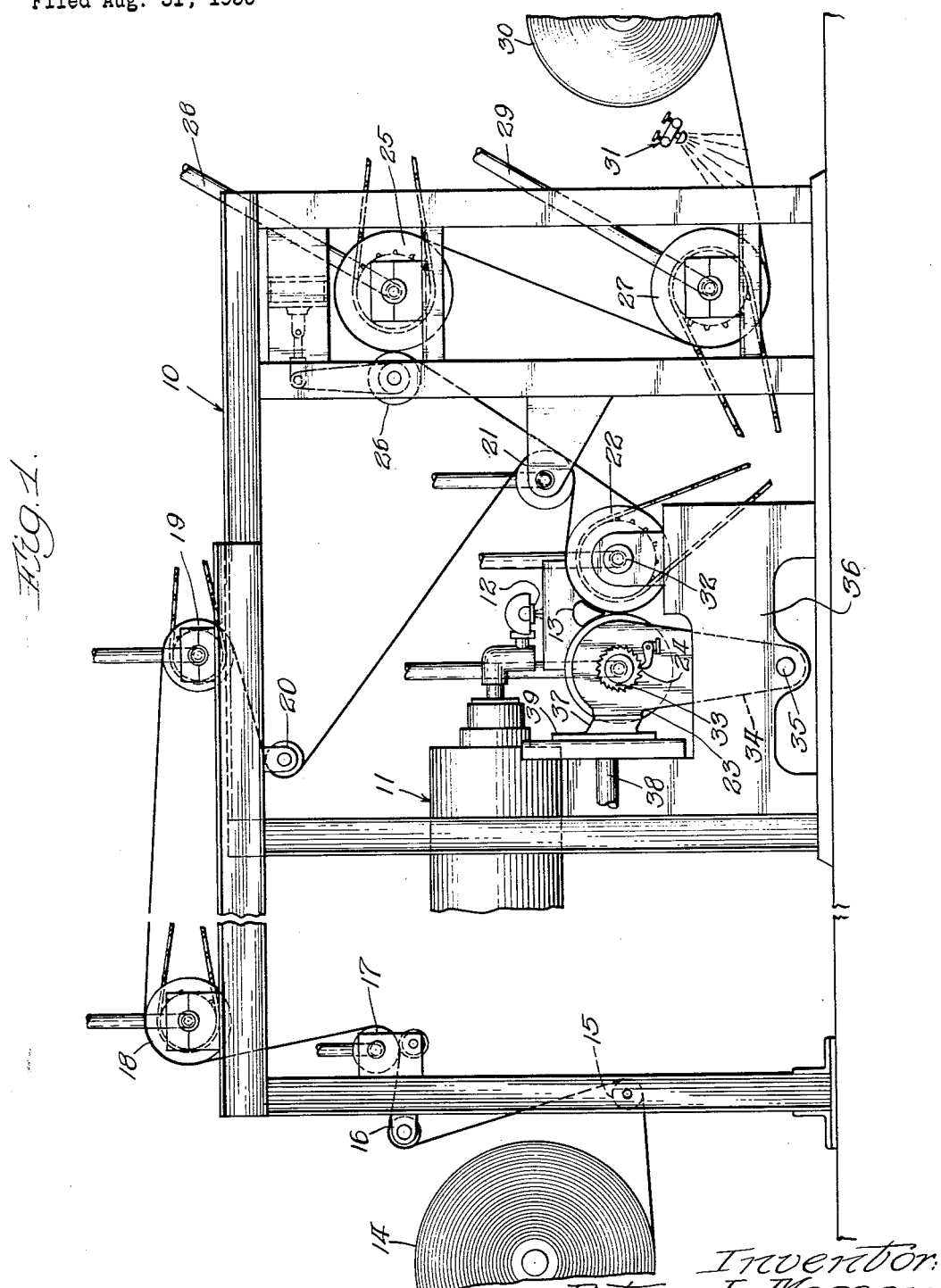
Fig. 1 is a diagrammatic side view of a device for applying the film of material directly to paper.

Referring to Fig. 1, there is provided a framework 10 which carries the various rolls of the coating apparatus. 11 indicates a conventional extruder which converts the resin from a solid to a liquid state and extrudes it in the form of a crude film of appropriate width and thickness. 12 indicates a slotted die head through which the crude film is extruded into the mass or roll 13. It is not essential under all conditions of operation that the head 12 be independent of the mass 13. Normally, there will be an interval in which the extruded film is noticeable, and it is preferred that the device operate in that manner.

14 indicates a roll of paper suitably supported for unwinding. The paper web travels over lead rolls 15 and 16 and then around heated rolls 17, 18 and 19, and guide roll 20. The preheat rolls 17, 18 and 19 are heated sufficiently to insure the removal of any free moisture in the paper web. Normally, it is sufficient to maintain the rolls at about 360° to 370° F. This also serves to preheat the paper.

From roll 20, the paper passes to roll 21, which serves as a lead and guide roll directing the paper onto the roll 22. Roll 21 is preferably also heated to about 360° to 370° F., and the roll 22 may be designated as the paper carrying roll or, simply, as the forming roll.

Pressed against roll 22 is a parallel roll 23 serving as a doctor roll. As will be observed, the rolls 22 and 23 are arranged side by side with their axes parallel and substantially in a horizontal plane. This provides a nip between them through which the coating material tends to fall by gravity although, of course, it cannot do so because of the pressure between the rolls. The position of the rolls is important, however, in that any material carried through the nip by the roll 23, if it falls from the roll, will not fall on the paper or on the roll 22.

The roll 22, of course, moves at the speed of the paper when carrying the paper with it. The roll 23 is substantially stationary, although means are preferably provided so that it may be moved slightly either continuously or periodically. Thus a ratchet mechanism 24 is provided to prevent rotation of the roll 23 in a counterclockwise direction (as seen in Fig. 1). In any event, the roll is moved much more slowly than is roll 22. The purpose of such movement as roll 23 has is primarily to prevent specific wear at any one point on the roll. It is of extreme importance that the roll formation be maintained exactly, and if it were maintained in one position for an undue length of time the wear would cause deviations from normal. If desired, means may be provided for rotating roll 23 opposite to the direction of the rotation of roll 22 so that the adjoining surfaces of the two rolls are moving in the same direction. The speed of roll 23 should be 2 per cent or less of the speed of roll 22. By slowly driving roll 23, a clean fresh surface of the roll is constantly moved into the nip between it and roll 22, and suitable cleaning means may be provided to clean the surface of roll 23 between the time any portion of the surface leaves the nip and then reenters it.

From roll 22, the paper passes to and around the roll 25 which serves as a cooler for the coating which has been applied at the nip between 22 and 23. Roll 25 is preferably maintained at a temperature of from 180° F. to 220° F. to cool the paper and the coating, the precise temperature depending upon the speed of paper travel. The surface of roll 25 should be chrome plated and very highly polished. It will be noted that the coated surface of the paper is against the face of roll 25, and further that the roll 26 exerts pressure for this purpose. The resin is plastic at this point and is still flowable at the roll temperature. Any pattern or defect in the face of roll 25, and to some extent in the face of roll 26, may be transferred to the plastic coating. By the same token, as the roll 25 is preferably provided with a mirror surface, the coating acquires a smooth glossy appearance by contact therewith. Roll 26 should be covered with a resilient material such as rubber. Inasmuch as rubber is heat-susceptible, one has the choice of using a short-lived rubber roll or a less resilient but longer-lived roll such as paper or asbestos paper covered roll. I have found in practice that a paper roll similar to those used on supercalenders is satisfactory.

From roll 25, the paper passes to the roll 27 which is a second cooling roll. Its construction is the same as 25 so far as surface is concerned, and it is also cooled. I have found that an ammonia-brine fluid is an economical and effective cooling solution for this purpose and may easily be thermostatically controlled to maintain a definite temperature. Means, in the form of pipes 28 and 29, are provided for supplying the cooling solution to the rolls 25 and 27, respectively.

The coated paper is finely wound up on roll 30. It is desired that the coating be cooled below the point at which it becomes tacky and yet have a temperature sufficiently high as to insure rapid crystallization of the coating. Polyethylene crystallizes rapidly between the temperatures of 120° F. and 140° F. while Saran crystallizes most rapidly between temperatures of 160° F. and 180° F. Above these temperatures crystallization does not take place, and the material itself is quite tacky. Below the minimum of these temperatures, crystallization takes place very slowly. If the surface of the coating is chilled suddenly to room temperature, the portion of the coating next to the paper remains quite warm and hence crystallizes rapidly while the cool portion crystallizes slowly. This is apt to produce distortion of the coating film. For this reason, the temperature of the roll 27 and, to some extent, that of the roll 24 are controlled to leave the entire film within the ranges indicated in order that the crystallization may take place not only rapidly but substantially simultaneously throughout the entire thickness of the film. The paper, as it is reeled up, provides its own insulation to retain its heat sufficiently long to permit rapid and complete crystallization.

31 indicates a water spray by which water may be sprayed onto the traveling web on the side opposite from the coating in order to recondition the paper to a moisture content of five to six per cent. The temperature of the water, of course, is properly adjusted so as not to disturb the optimum crystallization temperatures just noted. If desired, a steam spray may be used to remoisten the paper.

The construction of the rolls 22 and 23 is of particular importance. One of the rolls can be considerably smaller in size than the other and preferably the doctor roll 23 is the smaller roll. The purpose of the difference in size is primarily to produce a nip of the desired width, it having been found that the use of a smaller doctor roll requires the use of less pressure in order to obtain coats one mil or less in thickness.

It is likewise very important that the surface of the rolls 22 and 23 shall not be distorted at the high temperatures under which these rolls operate. For this reason, the surfaces at least should be of a material which has a small coefficient of expansion. I have found that the alloy known as Ni-resist Alloy No. 5 or under the trademark "Minovar" has a very small dimensional change. Also .55 carbon steel flame hardened to a depth of ⅜ inch and with a hardness of 80 shore minimum may be used.

As shown in Figures 2 and 3, the heated rolls are rifled to provide for the circulation of a liquid heating medium. Thus, for example, the roll 22 shown in those figures comprises a core 40 provided with a plurality of rifling grooves 41 and surrounded by a sleeve 42 of low expansion metal and having a highly polished surface. A liquid heating medium may be supplied to a central bore 43, extending longitudinally through the core, by means of a pipe 44 which extends thereinto. The bore 43 is connected to the rifling grooves 41 by means of the passages 45 formed at the end of the roll opposite that connected to the pipe 44. The bore 43 is enlarged at one end as shown at 46 and the space between the enlarged end 46 and the pipe 44 is utilized to effect the return of oil from the grooves 41 through a plurality of passages 47 and a second pipe member 48 surrounding the first pipe 44.

The extent of the rifling and the distribution thereof depends upon the particular heating medium used and the size of the roll. It is preferred to have accurate control for the temperatures of the various rolls which will range from 300° to 500° F. and for this purpose it is preferred to circulate a heating oil therethrough. A common source of hot oil may be employed for heating the various rolls and the degree of heating is determined by the velocity of oil circulation through the rolls. Thus, rolls which are to be maintained at similar temperatures, such as the rolls 17, 18, 19, and 21 may be supplied by a common pump while the rolls 22 and 23 may be supplied with hot oil from the common source by individual pumps operating at higher displacement.

It is desirable that the two rolls 22 and 23 not be covered with metal of the same nature, in order to avoid undue wear. It is preferred to have the doctor roll less resistant to scuff or scratching than the paper carrying roll. In this way, if particles of metal or other foreign materials become caught in the nip, the damage will be done to the doctor roll and the defect may be removed by changing the position of the roll. The roll 23, therefore, has the same structure insofar as heat transfer means and so forth are concerned, but the preferred surfacing material is a low-heat expanding metal such as a chrome iron alloy.

The thickness of the film of resin is largely determined by the temperature of the resin and the pressure between the rolls 22 and 23. The temperature may be controlled by proper synchronization of the temperature of the rolls 22 and 23 to each other and to the speed of the paper. The pressure between the rolls is controlled by suitable apparatus to produce a uniform pressure.

Roll 22 is mounted on a bearing 32 and a roll 23 on a bearing 33. Both of these bearings are of types able to operate at the high temperatures and pressures involved. Because of the necessity for precision, I have found it advisable to heat both of the bearings to a temperature of about 400° F. and to maintain this temperature constant.

Pressure may be directed upon either roll 22 or 23 toward the other, but I have found that pressure upon the roll 23 is normally most readily accomplished. I accomplish this by mounting the roll 23 on an arm 34 pivoted at 35 to a base 36. Pivotal movement of the arm to press the roll 23 against the roll 22 is carried out by a rod 37 actuated by compressed air from a source 38 and operating through a diaphragm 39 and adaptable to produce a pressure on the nip between the rolls 22 and 23 sufficient to produce a thickness of resin within the desired range which normally is from ¼ to 10 mils. This may be done with paper moving at 500 feet per minute with resin at a temperature of approximately 500° F. The pressure is in the order of 800 lbs. per lineal inch of nip with 18 inch diameter rolls.

Other means of applying pressure may be used, as for example, a larger roll bearing against roll 23.

It is preferred to maintain the roll 22 in a substantially rigid frame. It is preferable to maintain the roll 23 in a rigid frame which is held in a movable housing so as to provide for lateral movement under the operation of rod 37.

It is preferred to provide suitable means for rotating the roll 23 at the rate of one to fifteen revolutions per hour, in direct proportion to the speed of the web within the range of 100 to 1500 feet per minute.

Polyethylene may be extruded from what are known as extruder machines now on the market. Such machines are available from John Royle Sons of Paterson, N. J., and National Rubber Machinery Co., of Akron, Ohio. These machines heat the polyethylene under conditions where atmospheric air is not freely available, since the material will decompose or oxidize with accelerated rapidity when so exposed to air as the temperature is raised above 250° F. As the temperature approaches 600° F. this decomposition becomes extremely rapid. As explained, however, the films produced from such machines are not sufficiently uniform or accurate, particularly when thin films of the material are desired. By means of the apparatus and process here illustrated, the relatively crude film is supplied from the nozzle 12 to the puddle 13 at a substantially uniform rate and at substantially the rate at which the material will be removed through the nip. The nozzle is as wide as the length of the nip between rolls 22 and 23 so to supply the material across the entire nip. The resin is extruded into the puddle 13 at a temperature of about 500° F. and the rolls 22 and 23 are heated sufficiently to keep the resin from cooling. Roll 22 is maintained at a temperature of from 350° F. to 365° F. and the temperature of roll 23 may be varied between 370° F. and 480° F. as the particular operation may require. In the nip between rolls 22 and 23, it will be observed that the roll 22 is moving in a counterclockwise direction while roll 23 is standing substantially still. The resin in the puddle 13 is quite viscous and tends to cling to the paper which sets up a rolling motion tending to form a long, helical mass of material in the nip. The mass is squeezed into the nip, and the paper emerges from the nip with a coating of the desired thickness upon it. The helical mass formed by the puddle 13 may be likened in appearance or action to a roller shade and rotates in a direction opposite to the direction of the roll 22 so that the contacting surfaces are moving in the same direction. In this regard, it is interesting to note that with high molecular weight materials, such as polyethylene having a molecular weight of 19,000 or above, the puddle tends to urge the roll 23 towards rotation in the same direction as the roll 22. Thus if the roll 23 were free to rotate on its bearings, the puddle would act something like a gear or friction drive interposed between the rolls 22 and 23.

With lighter weight materials, such as polyethylene having molecular weight of 12,000, the roll 23, if free, rotates in the opposite direction as roll 22. Apparently with high molecular weight material the force exerted by the rotating puddle against the roll 23 is greater than the sheer force existing in the nip which, of course, tends to rotate the roll 23 in the opposite direction. With the use of lighter molecular weight material the reverse is true.

It should be noted that, while the supply of resin to the nip is substantially the same as the amount withdrawn from it, it does not necessarily follow that the thickness of the film supplied to the nip need be the same as the thickness of the film withdrawn from it. It is only necessary that the amount of material supplied to the nip be substantially the same as the amount of material withdrawn from it.

The heating of the rolls 22 and 23 is not a simple matter. High pressure steam is impracticable. Certain other high temperature heat transfer liquids prove undesirable because of odor. The liquid known as "Heat Transfer S. B. Oil" was the most satisfactory material employed. This liquid is not an oil in the sense that it has lubricating qualities, but is a liquid with a pour point of about 10° F. and a viscosity index of 300 at 100° F. It does not thin out markedly at higher temperatures and holds up well even at 600° F. It is a pure petroleum material. It should not, however, be used in contact with copper or bronze as these materials cause it to oxidize. Suitable heating units for such oil are available on the market as are pumps for circulating it at the high temperature by the quantity of oil circulated in a given unit of time. For example, if a temperature of 450° F. is required at the surface of the roll, the oil is held constant at 475° F. and variations in surface temperature are controlled by the speed of movement of the oil. An expansion tank is, of course, provided in the oil circulating system since there is a very considerable expansion in volume when the oil is heated.

Control of the thickness of the film delivered from the nip between the rolls 22 and 23 is accomplished by the use of air pressure on the diaphragms or dashpot arrangements by which the roll 23 is pressed against the roll 22. Normally, air pressures of 50 to 150 pounds are employed to obtain a range of thickness from one-quarter thousandths of an inch to ten-one-thousandths of an inch. The speed of the roll 22, of course, also controls the thickness of the film, the higher the surface speed the greater is the pressure required for any given thickness of coating. The type of paper being coated, likewise, affects the thickness of the film. Normally, the higher the finish and the lower the density or specific volume of the paper, the lower the net pressure required. On the other hand, the rougher the paper and the higher its specific gravity, the greater the pressure required for any given thickness of film more especially in the low range of ¼ mil to 2 mils.

The temperatures of rolls 22 and 23 are sufficiently high, of course, as to prevent the thermoplastic material from solidifying in the nip. It is important that the roll 23 be maintained at a higher temperature than the roll 22 to insure that the temperature of the paper passing through the nip is below the temperature of roll 23.

Polyethylene film, as normally extruded, is translucent and has a dull surface. It was found that by passing the coated paper between a resilient roll such as a rubber coated roll while pressing the paper against a roll cooler than the temperature of the paper a high sheen was produced upon the resin which greatly improved the appearance of the paper. It is believed that the effect of this pressing treatment is to cast a duplicate of the roll surface and reorient the film. The rolls for accomplishing this purpose are indicated at 25 and 26. As stated, the roll is provided with means for chilling and maintaining a uniform temperature of the surface at 200° to 220° F., according to the speed of paper travel. The roll is chrome plated and very highly polished to a mirror finish. The pressure of the roll 26 is sufficient to accomplish a substantial improvement in the appearance and physical properties of the coating.

The arrangement of a moving roll carrying the paper and a stationary roll adjacent it is a combination which must be carefully controlled. The paper web itself will not pass through the rolls under these conditions but will tear and bunch up. It was therefore entirely unexpected that the extremely viscous, tacky, and sticky thermoplastic material would serve as a lubricant to permit the passage of the paper and at the same time to form a remarkably uniform film of the thermoplastic on the paper.

The following conditions appear to be necessary in order to accomplish this:

1. The paper must be pre-heated sufficiently to eliminate free moisture.
2. The rolls, themselves, must be heated.
3. The rolls must be pressed together by fluid pressures such as compressed air so that at all operating positions of the rolls the pressure is the same and is yielding. Springs have not proved sufficiently accurate for this purpose, nor is the mere use of gravity pressure of one roll on another. For most use, pressures in the order of 800 lbs. per lineal inch of nip are satisfactory. The amount depends upon the thickness of film desired, other things being equal.
4. The relative temperature of the paper and the stationary roll and the thermoplastic material must be so controlled that the combination of the viscosity of the thermoplastic material adjacent the paper and its adherence to the paper shall exceed the viscosity of the thermoplastic material adjacent the stationary roll and its adherence to that roll. Inasmuch as the adherence of the thermoplastic to the paper appears to increase with temperature, while viscosity decreases with increased temperature, this requires a careful adjustment of temperature. It is likewise true that the adherence of the thermoplastic to metal increases with temperature. The temperature relationships described herein have proved satisfactory. For example, with the paper preheated to about 320° F., the roll 22 (the moving roll) at 375° F., the polyethylene at 520° F. to 540° F. it has been found that the stationary roll 23 may be heated from 450 to 480° F. These figures are for polyethylene having a molecular weight of about 20,000 for paper weighing 50 lbs. per ream, a speed of 400 feet per minute, a film thickness of 1½ mils and with roll 22 18 inches in diameter and roll 23 18 inches in diameter, and a fluid pressure of 800 lbs. per lineal inch. Under these conditions, it appears that the thermoplastic material adjacent the paper by being cooled increases in viscosity, whereas that portion of the material adjacent the relatively hot stationary roll decreases in viscosity. Under operating conditions it will be noted that the pool of thermoplastic material in the nip is rotating rapidly, something like a windowshade, that portion of the material adjacent the paper moving with the paper, and that portion adjacent the stationary roll moving in the opposite direction. So rapid is this movement that the meniscus which should form between the thermoplastic material and the stationary roll is not in evidence, there being a clear undercut to the rotating mass at its juncture with the substantially stationary roll.

5. It is preferable that the two rolls be so arranged that the nip opening faces upwardly.
6. The paper should enter the coating nip in contact with the moving roll and this contact should extend back beyond any point at which the paper is in contact with any appreciable weight of the coating material. If the paper is unsupported at any point where the weight of the coating material rests upon it, not only will the paper flutter, but the coating material is likely to get around the edges and underneath the paper. Breakage is very undesirable, since the paper and the thermoplastic material will quickly form a conglomerate which is extremely difficult to clean up.
7. The doctor roll must be stationary enough that it will not carry material through the nip adhering to it. Normally, this means that its speed will be less than 2% of that of the moving roll. If the speed of the stationary roll is too high, thermoplastic material will be carried through forming strings and these are likely to cause breakage of the paper.
8. The means for supplying the material to the nip between the rolls 22 and 23 should extend the entire length of the nip so as to supply the material in heated plastic condition substantially uniformly across the nip, and the puddle 13 should be maintained at a constant diameter.

In addition, the casting of the coated sheet by contact with the roll 25, particularly coupled with the smoothing action of the flexible roll 26 produces a sheet of superior finish and physical properties.

Various conditions of temperature and speeds correlated to the desired coating thickness and the type of polyethylene coating employed are set forth in the table below. The first column indicates the thickness of the film; the second the width of the paper being coated (thus the width of the nip); the third column the diameter of the puddle of coating material in the nip; the fourth column the speed of the travel of the paper; the fifth the pressure per square inch in the pressure producing device to produce the nip pressures hereinbefore mentioned; the next column the temperature of the doctor roll (roll 23); and the remaining columns indicate the molecular weight of the polyethylene, the temperature of the polyethylene as it is supplied from the extruder to the nip, the temperature of the polyethylene in the puddle in the nip, and the basis weight of the sheet being coated.

| Coating Thickness, mils | Width (In.) | Puddle Dia. (In.) | Speed (F. P. M.) | Pressure (p. s. i.) | Doctor Roll (9) Temp. (° F.) | Wt. of Poly. (mol. wt.) | Temp. of Poly. out of Extr. (° F.) | Poly. Temp. in Nip (° F.) | Basis Wt. (Lbs.) |
|---|---|---|---|---|---|---|---|---|---|
| 1 | 33⅛ | 3 | 410 | 77 | 435 | 19,000 | 560 | 530 | 49 |
| 1 | 33⅛ | 6 | 410 | 79 | 430 | 19,000 | 560 | 500 | 49 |
| 1 | 41⅛ | 3 | 340 | 79 | 420 | 19,000 | 560 | 530 | 49 |
| 1 | 41⅛ | 6 | 340 | 81 | 415 | 19,000 | 560 | 500 | 49 |
| 1 | 45⅛ | 3 | 300 | 81 | 415 | 19,000 | 560 | 530 | 49 |
| 1 | 45⅛ | 6 | 300 | 83 | 410 | 19,000 | 560 | 500 | 49 |
| 1½ | 43⅛ | 3 | 270 | 68 | 450 | 19,000 | 560 | 530 | 49 |
| 1½ | 43⅛ | 6 | 270 | 70 | 445 | 19,000 | 560 | 500 | 49 |
| 1½ | 48⅛ | 3 | 250 | 69 | 420 | 19,000 | 560 | 530 | 49 |
| 1½ | 48⅛ | 6 | 250 | 71 | 415 | 19,000 | 560 | 500 | 49 |
| 2 | 38⅛ | 3 | 218 | 54 | 420 | 19,000 | 560 | 530 | 49 |
| 2 | 38⅛ | 6 | 218 | 56 | 415 | 19,000 | 560 | 500 | 49 |
| 2 | 48⅛ | 3 | 165 | 55 | 435 | 19,000 | 560 | 530 | 49 |
| 2 | 48⅛ | 6 | 165 | 57 | 430 | 19,000 | 560 | 500 | 49 |
| 5 | 36 | 3 | 80 | 25 | 450 | 19,000 | 560 | 530 | 150 |
| 5 | 47 | 3 | 60 | 26 | 440 | 19,000 | 560 | 530 | 150 |
| 9 | | 3 | 43 | 24 | 410 | 23,000 | 560 | 530 | 150 |
| ¾ | 36⅝ | 3 | 520 | 47 | 360 | 12,000 | 370 | 350 | 40 |
| ¾ | 29 1/16 | 3 | 520 | 44 | 370 | 12,000 | 370 | 350 | 40 |

It will be noted that in Figure 1, the paper web passing from roll 22 to roll 25 comes in contact with the paper on roll 21. It has been found that this contact is of advantage in the smoothing of the paper. This may be due merely to the heating effect so produced, but it is believed that the frictional contact is in some manner of benefit.

While it is preferred that the axes of the stationary roll and of the horizontal roll be in the same horizontal plane, some variation is permitted but the deviation should not exceed 45°.

"Saran" is the trademark of the Dow Chemical Company for co-polymerized vinyl vinylidene chloride.

I claim:

1. The method of coating a web of material such as paper or the like with a highly viscous coating composition having a viscosity at 190° C. at least of the order of the viscosity of polyethylene having a molecular weight of the order of 19,000 and having a minimum working temperature in excess of 240° F., which comprises drying the web to reduce the moisture content thereof substantially to zero, bringing the web of material into contact with a rotating heated roll, carrying the web on said roll to the nip formed between said rotating roll and a substantially stationary parallel roll, feeding a sufficient amount of the coating composition heated to at least its minimum working temperature between said rotating roll and the substantially stationary roll to form a rotating roll-like mass of said coating composition therebetween extending substantially the length of the nip and continuously supplying the coating composition heated to at least its minimum working temperature into the rotating roll-like mass without precontacting any portion of the web therewith to provide a supply of the coating composition substantially uniformly between the rolls whereby contact between the rotating roll-like mass and the web is limited to prevent charring of the web, pressing the two rolls together, and correlating the temperature of the coating composition, the rolls and the web with the pressure so as to pass through the nip, the web and a coating of predetermined thickness of the coating composition on the surface thereof.

2. The method of claim 1 which includes rotating the heated rotating roll to rotate the roll-like mass of coating composition whereby to urge the second parallel roll toward rotation in the same direction as the heated rotating roll through the force applied thereto by the rotating roll-like mass and restraining the second parallel roll against such rotation whereby to maintain the second parallel roll substantially stationary.

3. The method of coating a web of material such as paper or the like with a highly viscous plastometric coating composition having a minimum working temperature in excess of 240° F., which comprises drying the web to reduce the moisture content thereof substantially to zero, bringing the dried web into contact with a heated rotating roll, carrying the web on said roll downwardly into an upwardly facing nip formed between said rotating roll and a heated substantially stationary parallel roll, continuously supplying the coating composition at a temperature at least equal to its minimum working temperature substantially uniformly across the entire nip formed between said rolls to form a rotating generally cylindrical pool of composition therein, maintaining said stationary roll at a temperature higher than that of the rotating roll whereby the coating composition is relatively cool at the web surface to provide a substantially higher viscosity therein adjacent the web than adjacent the stationary roll, pressing the two rolls together and correlating the temperature of the coating composition, the rolls and the web with the pressure so as to pass through the nip, the web and a coating of predetermined thickness of the coating composition on the surface thereof.

4. The method of claim 3 which includes maintaining the temperature of the rotating roll between 250° and 365° F.; maintaining the temperature of the substantially stationary roll between 370° and 480° F.; continuously supplying the coating composition directly to the nip formed between said rolls at a temperature of about 560° F., the temperature of said rolls serving to maintain the pool of material in said nip at a temperature not more than 60° less than the temperature at which it was supplied to the nip and the temperature of said rolls further serving to maintain the coating composition relatively cool at the web surface to provide a substantially higher viscosity therein adjacent the web than adjacent the stationary roll; and pressing the rolls together by fluid pressure to produce a nip pressure sufficiently great to prevent the web from passing through the nip if in contact with the stationary roll whereby to pass through said nip the web and a coating of predetermined thickness of the coating material on the surface thereof.

5. The method of coating a web of material such as paper or the like with a highly viscous plastometric coating composition having a minimum working temperature in excess of 240° F., which comprises drying the web to reduce the moisture content thereof substantially to zero, bringing the dried web into contact with a rotating roll maintained at a temperature above 350° F., carrying the web on said roll downwardly into an upwardly facing nip formed between said rotating roll and a heated substantially stationary parallel roll, continuously supplying the coating composition at a temperature at least equal to its minimum working temperature substantially uniformly across the entire nip formed between said rolls to maintain therein in a rotating generally cylindrical pool of composition, maintaining said stationary roll at a temperature higher than that of the rotating roll whereby the coating composition is relatively cool at the web surface to provide a substantially higher viscosity therein adjacent the web than adjacent the stationary roll, resiliently pressing the two rolls together under a pressure sufficiently great to prevent the web from passing through the nip if in contact with the stationary roll, and correlating the temperature of the coating composition, the rolls and the web with the pressure to pass through the nip, the web and a coating of predetermined thickness of the coating composition on the surface thereof.

6. The method of claim 5 including the step of maintaining said rotating pool at a substantially uniform diameter of at least 2½ inches.

7. The method of claim 5 in which said rolls are pressed together with sufficient force to produce a pressure in the nip of the order of 800 pounds per lineal inch.

8. The method of claim 5 in which the web, carrying a coating of the composition on the surface thereof and while still hotter than the minimum working temperature of the composition, is passed through a calendering nip with the coated side of the web in contact with a polished metal surface cooler than the paper.

9. In the application to a continuous flexible web of a crystalline thermoplastic material having a viscosity at 190° C. at least of the order of the viscosity of polyethylene having a molecular weight of the order of 19,000 and having a minimum working temperature in excess of 240° F., the steps which comprise melting the material at a temperature substantially above its crystallization point, applying the material in melted form to the web to form a coating thereon, chilling the surface of the material below the tacky point, winding the coated web into a roll at a temperature at least equal to the crystallization temperature of the thermoplastic material, and maintaining the web in self-insulating roll form until crystallization of the material is substantially complete whereby crystallization occurs slowly and uniformly throughout the entire film.

10. The method of claim 9 in which said material is polyethylene and wherein the temperature of the coating in the roll is self-sustained between 140° and 120° F.

for a period sufficient to effect substantially complete crystallization of the material.

11. The method of claim 9 in which said material is copolymerized vinyl vinylidene chloride and wherein the temperature of the coating in the roll is self-sustained between 160° and 180° F. for a period sufficient to effect substantially complete crystallization of the material.

12. Apparatus for coating a web of material such as paper or the like with a highly viscous coating composition having a viscosity at 190° C. at least of the order of the viscosity of polyethylene having a molecular weight of the order of 19,000 and having a minimum working temperature in excess of 240° F., which comprises a substantially stationary roll, a rotatable roll adjacent thereto, said rolls being mounted upon spaced parallel axes located in a single substantially horizontal plane, means for rapidly rotating the rotatable roll, means for yieldably urging the rolls together to provide therebetween an upwardly facing nip, means for supplying melted coating composition along the entire length of the nip, said rolls having a diameter sufficiently great as to maintain a roll-like mass of molten composition in said nip having a diameter of the order of at least 2½ inches, means for drying the web to approximately zero moisture content, means for passing the dried web around the rotatable roll in the direction of its rotation and through said nip, and means for heating the interior of said rolls for maintaining the surface of said rolls at a temperature of at least 350° F.

13. The apparatus of claim 12 in which the diameter of said rolls is at least 18 inches.

14. The apparatus of claim 13 including a highly polished metal roll, means for passing the coated web without substantial chilling from said nip and around the polished roll with its coated face in contact therewith, a resilient roll adjacent the polished roll, means for pressing the resilient roll against the polished roll to form a calendering nip through which the paper passes, and means for chilling the polished roll to a temperature below the temperature of the web as it is passed through said calendering nip.

15. The apparatus of claim 14 including a reel, means for passing the chilled web to a reel to be wound thereon into a self-insulating roll, and means for regulating the chilling of the polished roll to reduce the temperature of the material to a point below its tacky point but above its optimum crystallization temperature before said web is wound.

16. Apparatus for coating a web of material such as paper or the like with a highly viscous coating composition having a viscosity at 190° C. at least of the order of the viscosity of polyethylene having a molecular weight of the order of 19,000 and having a minimum working temperature in excess of 240° F., which comprises a substantially stationary roll, a rotatable roll adjacent thereto, said rolls being mounted upon spaced parallel axes located in a single substantially horizontal plane, means for heating the rolls including means for maintaining the substantially stationary roll at a temperature above the temperature of the rotatable roll, means for yieldably urging the rolls together to provide therebetween an upwardly facing nip, means for heating the material to a temperature substantially in excess of its softening point and in the absence of an oxidizing atmosphere, means for drying the web to approximately zero moisture content, means for passing the dried web around the rotatable roll in the direction of its rotation and through said nip, means for supplying the heated material directly into and substantially uniformly across the entire length of said nip without precontacting the web with said material, said rollers having metal surfaces and the metal surface of the substantially stationary roll being less resistant to abrasion than the metal surface of the rotatable roll.

References Cited in the file of this patent

UNITED STATES PATENTS

| | | |
|---|---|---|
| Re. 2,263 | Bickford | June 5, 1866 |
| 695,041 | Fues | Mar. 11, 1902 |
| 1,302,352 | French | Apr. 29, 1919 |
| 1,311,491 | Briggs | July 29, 1919 |
| 1,719,166 | Bradner | July 2, 1929 |
| 1,816,307 | Von Reis | July 28, 1931 |
| 2,054,113 | Abrams et al. | Sept. 15, 1936 |
| 2,089,524 | Abrams et al. | Aug. 10, 1937 |
| 2,304,819 | Grupe | Dec. 15, 1942 |
| 2,466,718 | Lobstein | Apr. 12, 1949 |
| 2,499,421 | Samler | Mar. 7, 1950 |

FOREIGN PATENTS

| | | |
|---|---|---|
| 600,687 | Great Britain | Apr. 15, 1948 |